(12) United States Patent
Tannenbaum

(10) Patent No.: US 11,208,039 B2
(45) Date of Patent: Dec. 28, 2021

(54) VEHICULAR SURVEILLANCE SYSTEM

(71) Applicant: Adam Benjamin Tannenbaum, Ashdod (IL)

(72) Inventor: Adam Benjamin Tannenbaum, Ashdod (IL)

( * ) Notice: Subject to any disclaimer, the term of this patent is extended or adjusted under 35 U.S.C. 154(b) by 326 days.

(21) Appl. No.: 16/521,923

(22) Filed: Jul. 25, 2019

(65) Prior Publication Data

US 2021/0023991 A1 Jan. 28, 2021

(51) Int. Cl.
*B60R 1/00* (2006.01)
*G06K 9/00* (2006.01)
*G06F 3/01* (2006.01)

(52) U.S. Cl.
CPC ............... *B60R 1/00* (2013.01); *G06F 3/013* (2013.01); *G06K 9/00845* (2013.01); *B60R 2300/50* (2013.01)

(58) Field of Classification Search
CPC combination set(s) only.
See application file for complete search history.

(56) References Cited

U.S. PATENT DOCUMENTS

| | | | |
|---|---|---|---|
| 5,111,289 A | 5/1992 | Lucas et al. | |
| 5,793,308 A | 8/1998 | Rosinski et al. | |
| 6,211,907 B1 | 4/2001 | Scaman et al. | |
| 7,548,803 B2 | 6/2009 | MacCarthy | |
| 7,697,028 B1 | 4/2010 | Johnson | |
| 8,625,815 B2 | 1/2014 | DeLine et al. | |
| 9,843,777 B2 | 12/2017 | Schoefield et al. | |
| 10,272,839 B2 | 4/2019 | Lynam et al. | |
| 11,147,464 B2 * | 10/2021 | Murakami | A61B 5/7246 |
| 2006/0274829 A1 | 12/2006 | Siemens et al. | |
| 2008/0239077 A1 * | 10/2008 | Kurylo | H04N 7/18 348/148 |
| 2008/0259161 A1 | 11/2008 | Hellman et al. | |
| 2013/0286177 A1 * | 10/2013 | Deleeuw | G02B 27/0093 348/77 |
| 2020/0057487 A1 * | 2/2020 | Sicconi | G06T 7/174 |

* cited by examiner

*Primary Examiner* — Joon Kwon
(74) *Attorney, Agent, or Firm* — Robert Brownstein

(57) ABSTRACT

The invention is a vehicular surveillance system that captures images of road and vehicles in front of a vehicle as well as position and gaze of a driver. The images are captured and stored so as to enable someone to access image data captured prior to and at the time of an accident.

5 Claims, 3 Drawing Sheets

VEHICULAR SURVEILLANCE SYSTEM

TECHNICAL FIELD

The invention is a vehicular surveillance system that records images reflected from a rear-view mirror and those visible beyond a windshield.

BACKGROUND OF INVENTION

Along with other vehicular safety devices there are digital devices that attach to windshields and capture real-time images from beyond the windshield that are buffered for some predetermined amount of time. For example, a buffer could contain 20 minutes of recorded video so that at any time the buffer contains whatever occurred at the moment and up to 20 minutes prior to that moment.

Such systems can provide evidentiary proof, for example, that a driver was maintaining a safe distance from a vehicle in front at the time of a multiple vehicle collision. In conjunction with stored vehicular sensor readings at or just before an accident, it could show that a vehicle was traveling at or below a posted speed limit and identify when brakes were applied.

As described, though, the single camera system does not show a driver's position and gaze just prior to or at the moment of a collision. So, even though the driver kept a safe distance and speed, one has no way of determining if a driver's attention was distracted just prior to an accident, or having dropped something on the floor of the vehicle, the driver was bending over to retrieve it.

An invention that was capable of both capturing what was occurring outside the windshield in front and to the front on both sides of a vehicle and concurrently a driver's position and gaze could provide substantially more information upon which to judge the contributing causes of an accident. Furthermore, images of a driver's gaze could be used to detect the onset of drowsiness and initiate an audible alarm to alert the driver to pull over. This capability could help prevent accidents where drivers momentarily fall asleep behind the wheel. It is believed this can replace three sensors: the seat occupancy sensor for seat belt, the air bag position sensor, and the hands on wheel sensor In vehicles of autonomous level 2 or 3, it could be used to have a vehicle safely pull off the road.

BRIEF DESCRIPTION OF INVENTION

The invention herein disclosed is a system that provides surveillance of images reflected from a rear-view mirror and those entering a windshield. A digital video camera with a wide-angle lens is housed inside an enclosure that is positioned on a vehicle's ceiling, essentially equidistant from both vehicle sides and with the wide-angle lens pointing so as to capture images reflected in the rear-view mirror and those seen through the windshield in front of and to the front/left and front/right sides.

The subsystems mounted in the ceiling enclosure comprise the camera and a wireless transmitter to which digital image data is conveyed by the camera subsystem and transmitted inside the vehicle.

Another subsystem comprises a wireless receiver operative to receive the transmitted image data, a processing subsystem operative to manage image data capture and storage, plus subsystems for dynamic storage of real-time image captures and mass storage for storing predetermined quantities of captured image data.

For example, with a predetermined time limit of five minutes, or some amount of captured video data, when the limit is reached, the processing subsystem would transfer that data block to a mass storage subsystem. Thus, a continuous flow of digital data is being captured and conveyed from the ceiling enclosure-resident subsystems and the received data is being buffered by the dynamic memory and transferred in blocks of image data to a mass storage subsystem. An I/O subsystem, using conductive or wireless conveyance, would allow captured blocks of image data to be copied onto ancillary systems for later viewing.

One novel aspect of the invention is the position of the camera and lens so as to simultaneously capture images from in front of the vehicle as well as driver position and gaze. Another novel aspect is the ability to add the surveillance system to an existing vehicle that supports transfer of wireless data. Because there are no cables or conductive paths between the ceiling-mounted enclosure and the receiver, processor, storage subsystems, there is no need to install add-on cables, later, or even during vehicle manufacture. As a result, one benefit of the invention is cost-saving installation. Another benefit is accessibility to image blocks that may provide evidentiary proof that could mitigate or negate liability.

DETAILED DESCRIPTION OF INVENTION

Figure 1:
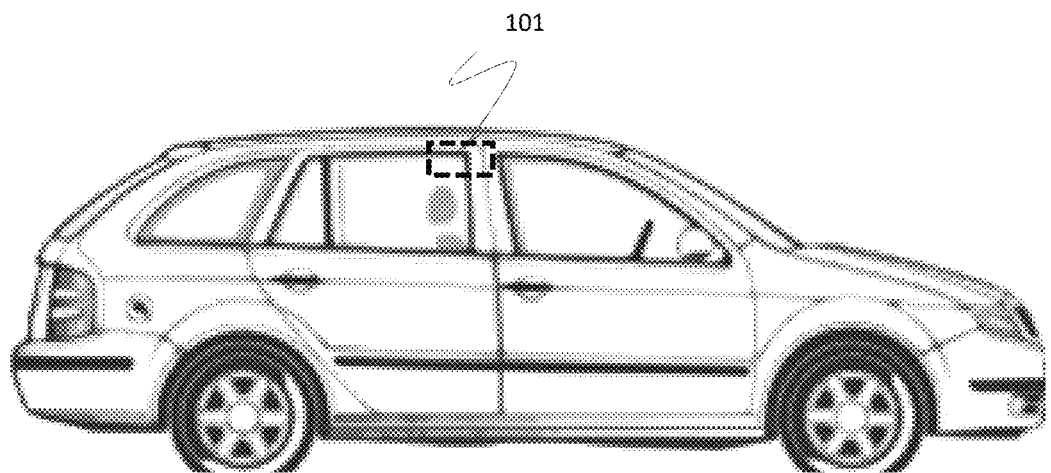
FIG. 1 depicts the position of the subsystem enclosure on the vehicle ceiling.

Until such time as all terrestrial vehicles are under the control of processors using complex algorithms and sensor data for efficient and essentially accident-free travel, we will have to make do with human drivers and human frailties.

The term "accident" is often a misnomer to describe a vehicular mishap. With careful reconstruction and analysis it is usually possible to assign disproportionate blame on one driver. When that happens, of course, there is also disproportionate liability and penalty. So, it is becoming more important for drivers to have as much evidence as they can when an accident occurs that can later be relied upon in determining cause and liability.

It is becoming more common, today, for drivers to have dashboard mounted cameras that can record conditions ahead of their vehicles just prior to and at the time of an accident. Such cameras can show the distance between two vehicles, for example, or a vehicle unsafely changing lanes affecting the safe distance between it and the vehicle behind it.

However, such surveillance systems tend to show only what is in front of a vehicle just before and at the time of an accident. It is unlikely that the same system will also show the driver's position and gaze prior to and at the time of an accident. Thus, accident responders who must try to backwards engineer the relative positions and speeds of involved vehicles leading up to an accident often have to deal with qualitative assumptions. For example, if two vehicles collide on a freeway and the damage to the front end of the rearward vehicle is consistent with an impact of, say, 20 mph speed, one may only conclude that the rear vehicle was traveling 20 mph faster than the front vehicle when they collided. The front vehicle may have been stopped and the rear vehicle slowed down to 20 mph just before colliding. Or, the front vehicle may have been going 60 mph and the rear vehicle going 80 mph. In each case, the resulting collision damage is consistent with the rear vehicle traveling 20 mph faster than the forward one.

Having a camera that shows the video images just prior to an accident and at the time of an accident can show relative motion of both vehicles. If both were moving, then the scenario where one was stopped and the other had braked to 20 mph can be eliminated. It may also be possible based on video analysis to calculate the actual and relative speeds. Having sensor data in at least one vehicle to determine its speed at the time of the collision makes things simpler. But what about the drivers? Were both drivers looking ahead just before and at the time of the collision? If the rear driver was distracted and looked away from the windshield just prior to the accident, his or her reaction time will be degraded. That cannot be determined, however, by looking at the vehicles' relative speeds. It requires looking at the drivers.

The invention herein disclosed and claimed uses a wide-angle lens equipped video camera, mounted in an enclosure, on the vehicle ceiling, halfway between the vehicle sides and essentially above the backs of the front seats. From that vantage point, the camera is able to capture images of the driver's position and face as reflected by the rear-view mirror and to also capture images in front of the vehicle through the windshield. Instead of requiring two cameras—one aimed at the road in front and one aimed at the driver—this invention captures both road in front and driver images using just one camera. Furthermore, it will work irrespective of the driver's seat position because the camera is positioned so that it captures the driver's face when the driver has adjusted the mirror to view out the rear. Nearly all drivers will readjust the rear view mirror when changing seat position which will then properly align the surveillance invention camera without need for adjustment.

As the camera is capturing real-time video images, these images are being transmitted by a wireless transmitter contained within the same vehicle ceiling enclosure. A nearby wireless receiver, perhaps located in a dashboard enclosure, captures those wirelessly conveyed video images. A subsystem comprising a processor, dynamic memory, and mass storage is used to transfer blocks of image data when the time or quantity of data reaches some predetermined limit. The blocks are transferred to mass storage allowing the dynamic memory to continue storing real-time images without interruption. The result is the invention captures continuous video image data, and that data is regularly sent as a block to a non-volatile mass storage subsystem. All of these tasks are under the management of the processor subsystem and its firmware or firmware/software.

At any time, the blocks of data that have been stored in mass storage may be accessed and copied by a compatible system via a conductive and/or wireless input-output (I/O) subsystem.

Since one is unable to predict when an accident is likely to happen, the invention herein described will begin operating whenever the engine is started and stop operating when the engine is turned off. Therefore, from the time the engine is started until it is stopped, a continuous stream of video image data is captured and conveyed to the processor/memory/mass storage subsystems for non-volatile storage. Once the mass storage system nears a predetermined capacity, some proportion of stored images are deleted based on earlier date/time metadata. Assuming the mass storage can hold 30 days of 24 hour seven days per week of video image data, and the system is designed to delete half the storage at a time, then the most recent 15 days of video image data storage will always be accessible.

The invention also makes it possible to have adjunct programs that can analyze incoming video data and more specifically the driver's gaze images so that it may detect early drowsiness and issue an audio alert for the driver to pull over when safe to do so. By having a second camera in the ceiling enclosure pointed out the back window, one may now add information about what is occurring directly behind a vehicle plus rear/left and rear/right as well as in front of a vehicle plus front/left and front/right prior to and at the time of a collision.

Because the invention uses wireless conveyance of real-time video image data, no conductive cabling needs to be included to interface the camera or cameras in the ceiling enclosure with the other invention subsystems. That would allow the invention to be added after a vehicle was manufactured. It would also lower the cost of including it during vehicle manufacture.

The I/O subsystem that allows stored video image data to be accessed and copied could use wireless interface or conductive interface. So, for example, the ancillary system might interface with the invention system via a wireless interface such as Bluetooth. Or, the ancillary system might interface using a cable and USB interface.

With this overview of the invention the following is meant to more explicitly describe its constituent subsystems and their interrelationships.

The following terms, which may be used in the claims, are defined as follows:
a video camera comprises a wide-angle lens, photo-sensing, and digitizing to produce digital video image data.
The data may comply with any video standard;
a wireless transmission subsystem comprises a digital data input, modulator and transmitter. It is operable to convert digital data input into wireless data output;
a wireless receiver subsystem comprises an antenna, receiver, and decoder. It is operable to convert wireless data input into digital data output;
a dynamic memory subsystem is a fast storage unit operable to buffer incoming digital data received from a wireless transceiver;
a mass storage subsystem is a non-volatile storage system operable to receive and store digital data blocks received from a dynamic memory subsystem.
These definitions point out the functional aspects of these terms and it is understood that physical implementation may take different forms as is well known in the art.

In FIG. 1, a vehicle is shown and the position of the ceiling-mounted enclosure (101) is shown from a side view. It would be located essentially halfway between the sides of a vehicle and just above the seatbacks of the front seats.

Figure 2:
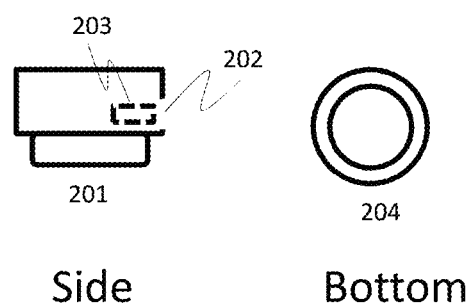
FIG. 2 shows a side view of the two-tiered enclosure of FIG. 1 with the camera and opening for the camera lens in the upper tier; and the dome light in the lower tier; and a bottom view showing the concentric circular upper and lower tier.

FIG. 2 shows one implementation of the ceiling-mounted enclosure in which the side view (201) shows a larger circular portion wherein the camera (203) and wireless transmitter subsystems are contained and an opening (202) is shown where the wide-angle lens would peer through. A smaller circular portion below the larger portion could contain a dome light. A bottom view (204) shows the circular portions as concentric.

Figure 3:
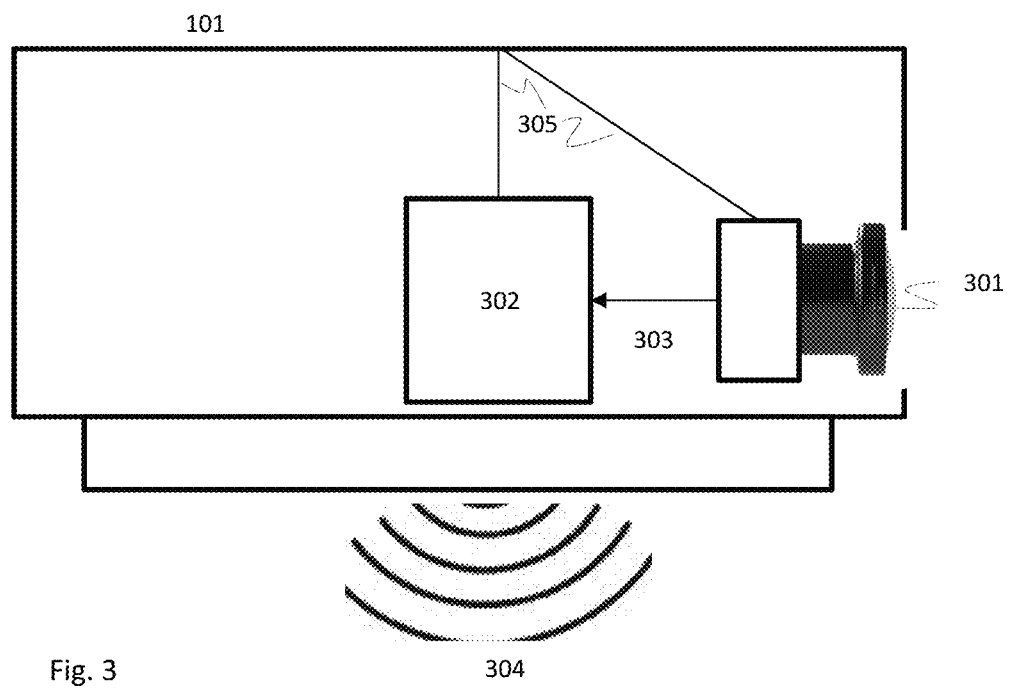
FIG. 3 shows the camera subsystem, wireless transmitter subsystem, and power conductive path for both subsystems.

FIG. 3 shows the view of the subsystems located inside the ceiling enclosure (101) comprising a digital video camera and wide-angle lens (301), a wireless transmitter subsystem (302), a conductive path conveying video image data to the wireless transmitter subsystem (303), a wireless signal being transmitted (304), and power input conductive paths (305). The power may be supplied by the vehicle's dome-light power circuitry, or it may be provided by a self-contained battery.

Figure 4:
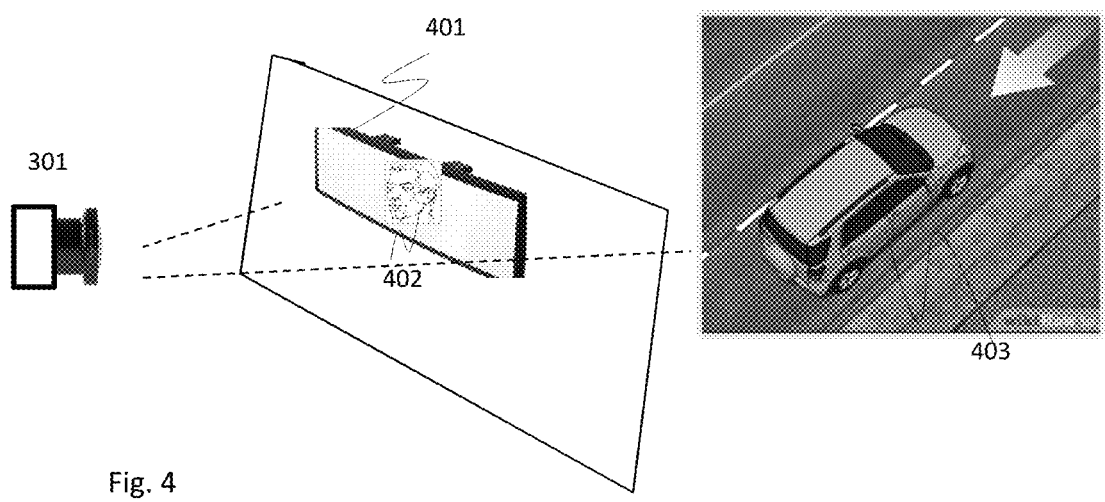
FIG. 4 shows the video camera wide-angle lens picking up images reflected from a rear-view mirror and from the windshield of the vehicle.

FIG. 4 shows the digital video camera and wide-angle lens (301) positioned so as to capture images (402) reflected from a rear-view mirror (401) as well as those images (403) captured by the lens in front of the vehicle through its windshield.

Figure 5:
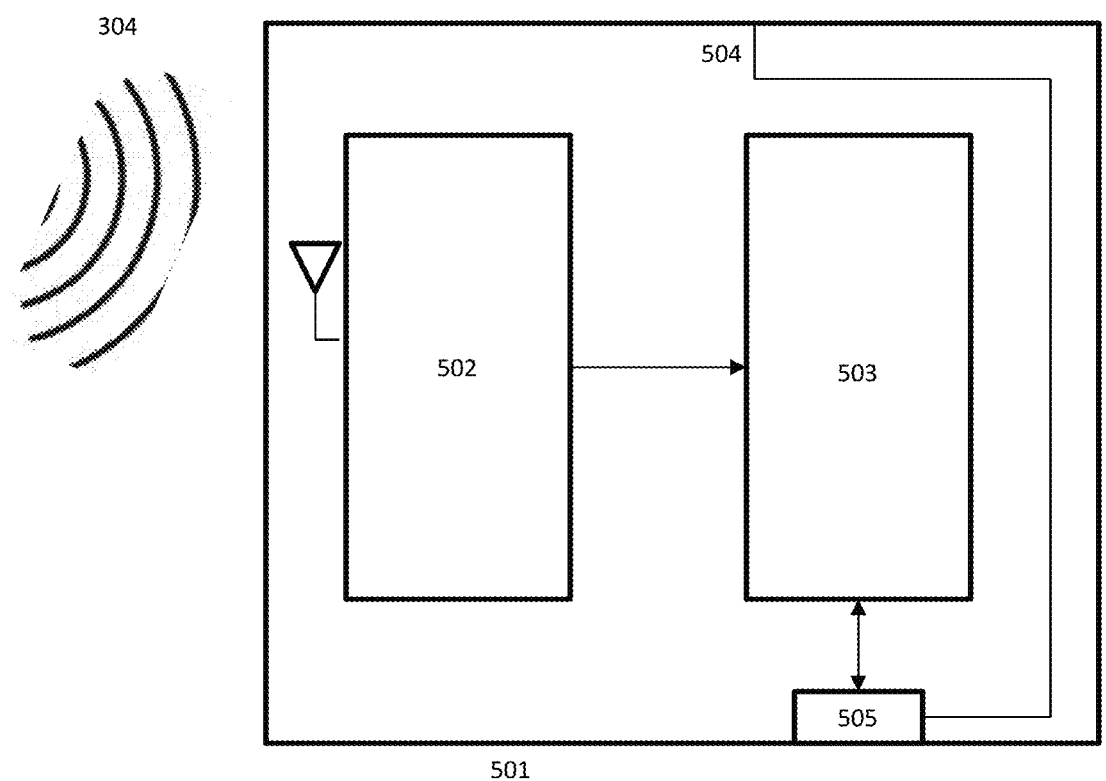
FIG. 5 shows another group of invention subsystems comprising a wireless receiver, processor, dynamic memory, mass storage and I/O.

FIG. 5 shows more of the inventions subsystems (501) comprising a wireless receiver (502) operable to receive a wireless signal (304) and convey the digital video image data to a processor subsystem (503) which will capture incoming real-time data and transfer blocks of captured data to a mass storage subsystem (505). Access to blocks stored in 505 can be made through I/O subsystem 504. Although shown as a conductive path, the I/O may also be implemented as a wireless interface to 505.

Figures and descriptions are meant to be exemplary. Subsystems may be discrete or combined into integrated blocks. Programs for managing and storing incoming digital video image data may be done in a variety of ways known to those in the art.

What is claimed is:

1. A system comprising:
a vehicle ceiling-mounted enclosure operative to enclose at least one digital camera, and a wireless transmission subsystem;
said at least one digital camera is operative to capture, simultaneously, driver images as reflected from a rear-view mirror and images outside a windshield;
said wireless transmission subsystem is operative to accept said driver images and windshield images data conveyed to it by said at least one digital camera;
said wireless transmission subsystem is operative to transmit, wirelessly, said driver images and windshield images data to a nearby wireless receiving subsystem;
said wireless receiving subsystem is operative to convey via an input/output subsystem said driver images and said windshield images data to a processing subsystem;
said processing subsystem is operative to process said driver images and said windshield images data, conveyed to it by said wireless receiving subsystem;
said processing subsystem is operative to convey processed driver images and windshield images data to a dynamic-memory subsystem; and
said dynamic memory subsystem is operative to convey said processed driver images and windshield images to a mass-storage subsystem for non-volatile storage of said processed driver images and windshield images.

2. A system as in claim 1 further comprising:
a wide-angle lens on a second digital camera is aimed at a rear window and rear cabin area.

3. A system as in claim 1 further comprising:
said at least one digital camera captures continuous video whenever a vehicle's engine is started;
said processing subsystem manages capture and storage of said driver images as reflected from a rear-view mirror and images outside a windshield;
said dynamic memory subsystem can accommodate at least some predetermined quantity of said processed driver images and windshield images data; and
said processing subsystem transfers captured and stored said processed driver images and windshield images data to said mass storage subsystem in increments of said predetermined quantity of said processed driver images and windshield images data.

4. A system as in claim 2 further comprising:
said second digital camera captures continuous rear-window video whenever a vehicle's engine is started;
said processing subsystem manages capture and storage of said second digital camera's said rear-window video output;
said dynamic memory subsystem can accommodate at least some predetermined quantity of said rear-window video output data; and
said processing subsystem transfers captured and stored said digital rear-window video output data to said mass storage subsystem in increments of said predetermined quantity of said rear window video output data.

5. A method comprising:
starting a vehicle engine;
starting one or more digital video cameras upon said vehicle engine startup;
capturing as video content images reflected by a rear-view mirror;
capturing as said video content images in front of said vehicle as detected through a windshield;
conveying by a wireless transmission subsystem data representing said video content images;
receiving by a wireless reception subsystem said data representing said video content images;
managing of said data received by a processor;
storing, dynamically, by said processor said data representing said video content images;
transferring by said processor said data to a mass-storage subsystem when quantity of data reaches some predetermined value; and
continuing capturing, storing dynamically, and transferring data to said mass storage for full duration of time said vehicle engine is running.

* * * * *